(No Model.)
J. B. WOOD.
SADDLE BAG FOR BICYCLES.
No. 299,609. Patented June 3, 1884.
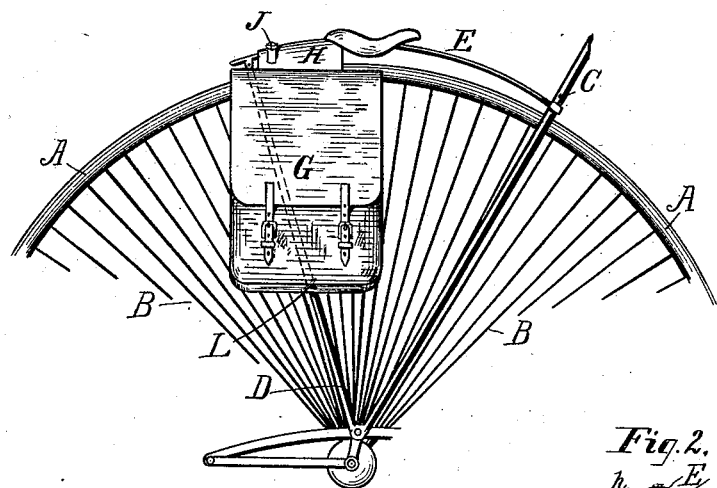
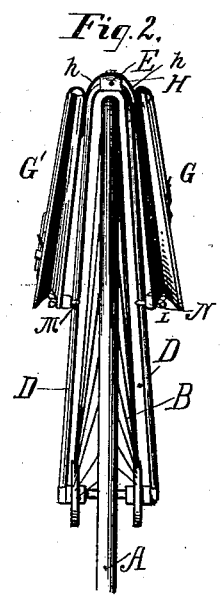
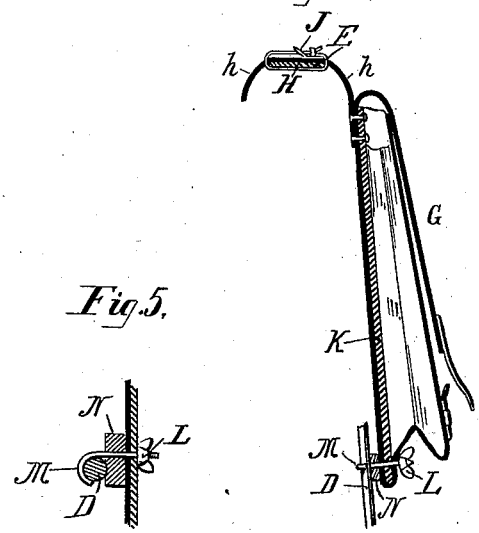
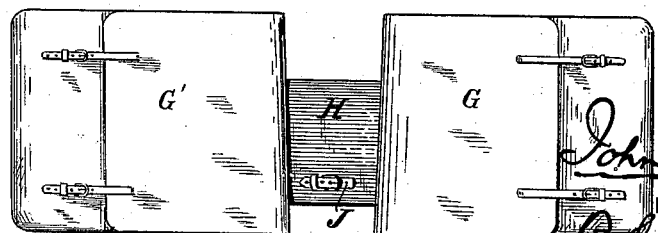
WITNESSES:
INVENTOR
John B. Wood

UNITED STATES PATENT OFFICE.

JOHN B. WOOD, OF CAMDEN, NEW JERSEY.

SADDLE-BAGS FOR BICYCLES.

SPECIFICATION forming part of Letters Patent No. 299,609, dated June 3, 1884.

Application filed April 4, 1884. (No model.)

*To all whom it may concern:*

Be it known that I, JOHN B. WOOD, of the city of Camden and State of New Jersey, have invented a new and useful Improvement in Bicycles, of which the following is a specification.

The object of my invention is to provide a bicycle of the class or construction known as the "star bicycle," in which the small or guiding wheel is in front and the large or carrying wheel in the rear, with saddle-bags for containing and carrying articles for the use of the rider, in such manner that the weight of the bags and their contents will be borne mainly by the carrying-wheel, while the operation of mounting upon or dismounting from the machine, as well as its propulsion by the rider, will not be interfered with thereby.

A convenient form of a preferred embodiment of my invention is hereinafter described and claimed.

In the drawings, Figure 1 is a partial view in side elevation of a star bicycle provided with my improvement. Fig. 2 is a rear elevation of the parts shown in Fig. 1. Figs. 3 and 5 are vertical sectional views in detail of some of the devices shown in Fig. 2, and Fig. 4 is a top plan view of the saddle-bags detached from the machine and unfolded so as to lie in the same plane.

In the drawings, A represents the rim and tire of the wheel of a star bicycle, and B are the spokes of said wheel.

C and D represent, respectively, front and rear upright rods, which, in the usual manner, support the saddle-bar or spring E.

G G' are saddle-bags, made of leather, canvas, or other suitable material, provided, respectively, with a backing, K, formed of leather-board or other stiff and unyielding substance, whereby the bulging of the bags when packed toward the wheel, and the consequent interference of said bags with the motion of the wheel, is prevented. The saddle-bags are connected together by a strip or piece, H, of leather or other suitable pliable material, and are supported upon and attached to the bicycle by being slung across the saddle-bar in such manner that the connecting-strip H rests
upon said bar under and to the rear of the saddle, the bags proper, G G', respectively depending on either side of the wheel and resting against the outer surface of the rear upright rods, D, of the bicycle. In this position the bags may be secured, as indicated in the drawings, by buckling the strap J around the saddle-bar E, and by attaching the lower ends of the bags G and G', respectively, to the rear upright rods, D D, by means of a clutch, M, and thumb-screw L, a rubber washer, N, being preferably interposed between the backing of the bag and the rod D, whereby the loosening of the thumb-screw and detachment of the bag by the vibration of the bicycle or the wearing or running of parts is prevented.

In the operation of the machine, as is well understood, the weight of the rider under certain conditions causes the saddle-bar E and its supported saddle to move into close and abnormal proximity to the tire or rim of the wheel.

To avoid conflict with the wheel under the conditions above described of the saddle-bags, as would happen by reason of the respective lower extremities thereof being fixedly attached to the upright rods D D, the portions h of the leather connecting-piece lying between the upper edges of the bags and the point at which said connecting-piece passes over and is supported upon the saddle are made sufficiently long to fold and take up the motion due to the abnormal approach to the wheel of the saddle-bar and its supported saddle.

From the construction of the saddle-bags and the mode of supporting them upon and attaching them to a bicycle, as above described, it will be seen that the weight of the bags and their contents is so disposed as to be nearly central over the wheel and to be exerted in nearly the same line as the weight of the rider. The position of the bags, moreover, is such as to interfere neither with the mounting or dismounting of the rider upon or from the machine, nor with the operation thereof by him.

The disadvantage incident to the attachment of saddle-bags to the front upright rod of a bicycle of the class referred to, whereby every change of the angle of the guide-wheel requires a readjustment of balance of the rider's weight, is, by my improvement above described, obviated.

I do not confine myself to the exact construction of saddle-bags, nor to the exact method of attaching the same to a bicycle, hereinbefore described, although I have found such construction and mode of attachment advantageous.

Having thus described my invention, I claim—

1. In a bicycle of the class herein described, and in combination therewith, saddle-bags supported upon and attached to the bicycle-frame or to an attachment thereof at a point in the rear of the saddle and nearly central over the carrying-wheel, as specified.

2. In a bicycle of the class hereinbefore referred to, saddle-bags the pouches of which at their upper extremities are connected together by a strip of leather or other pliable material, in combination with the saddle-bar and rear upright rod, said saddle-bags being supported by having the strip of leather or other material connecting their upper ends slung across said saddle-bar and fixed thereto by a buckle or other suitable device, and having the pockets or pouches thereof secured at their lower extremities to said rear upright rod by a thumb-screw and clamp or other suitable fastening device, as and for the purpose specified.

3. In combination with the saddle-bar E and rear upright rods, D D, of a bicycle, saddle-bags the lower extremities of the pockets of which are fixedly attached to the respective rods D D, and the upper extremities of said pockets or pouches of which are connected by a strip, H, of leather or other yielding material, which at its central portion is supported upon and fixedly attached to the saddle-bar E in such manner that yielding portions $h\ h$ are provided, as and for the purpose specified.

In testimony whereof I have hereunto signed my name this 25th day of March, 1884.

JOHN B. WOOD.

In presence of—
W. C. STRAWBRIDGE,
J. BONSALL TAYLOR.